(12) United States Patent
Kato et al.

(10) Patent No.: US 7,492,492 B2
(45) Date of Patent: Feb. 17, 2009

(54) IMAGE SENSOR, READING DEVICE AND METHOD FOR SETTING PARTICULAR MODE

(75) Inventors: Tetsuya Kato, Chiryu (JP); Hideaki Nagasaka, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1054 days.

(21) Appl. No.: 10/831,106

(22) Filed: Apr. 26, 2004

(65) Prior Publication Data

US 2005/0002071 A1 Jan. 6, 2005

(30) Foreign Application Priority Data

Apr. 28, 2003 (JP) ............................. 2003-123861

(51) Int. Cl.
*H04N 1/04* (2006.01)
(52) U.S. Cl. ..................................... 358/474; 358/482
(58) Field of Classification Search ................ 257/241; 382/312, 299; 358/474, 482, 483
See application file for complete search history.

(56) References Cited

U.S. PATENT DOCUMENTS

| 4,876,703 | A | * | 10/1989 | Urata et al. ................... 377/62 |
| 7,352,497 | B2 | * | 4/2008 | Hori ........................... 358/482 |
| 7,365,888 | B2 | * | 4/2008 | Yokochi ..................... 358/482 |
| 7,414,760 | B2 | * | 8/2008 | Kato .......................... 358/474 |
| 2004/0190087 | A1 | * | 9/2004 | Ikeno et al. ................. 358/482 |
| 2006/0232702 | A1 | * | 10/2006 | Joskin et al. ................ 348/362 |
| 2008/0100888 | A1 | * | 5/2008 | Nagasaka ................... 358/514 |

FOREIGN PATENT DOCUMENTS

| JP | 57057092 | * | 4/1982 |
| JP | A 62-194775 | | 8/1987 |
| JP | A 5-227362 | | 9/1993 |
| JP | A 06-245034 | | 9/1994 |
| JP | A 2000-101803 | | 4/2000 |

* cited by examiner

*Primary Examiner*—Jerome Grant, II
(74) *Attorney, Agent, or Firm*—Oliff & Berridge, PLC

(57) ABSTRACT

An image sensor, a reading device and a method for setting a particular mode are provided. The image sensor comprises a plurality of photoelectric converting elements, for converting optical signals to electric signals; a group of channel select switches, each channel select switch arranged between a charge output unit of each channel select switch and a signal line corresponding to each photoelectric converting element, wherein the group of the channel select switches can be turned on and off sequentially synchronizing with an externally supplied clock pulse signal; and particular mode setting means, wherein when a clock pulse signal and a start signal with a fixed width are input, the particular mode setting means sets a particular mode under a specific combination pattern of the clock pulse signal and the start signal.

13 Claims, 14 Drawing Sheets

IMAGE SENSOR, READING DEVICE AND METHOD FOR SETTING PARTICULAR MODE

CROSS-REFERENCE TO RELATED APPLICATION

This application claims the priority benefit of Japanese application serial no. 2003-123861, filed on Apr. 28, 2003.

BACKGROUND OF THE INVENTION

1. Field of the Invention

The present invention relates in general to an image sensor, a reading device and a method for setting a particular mode. In particular, the present invention relates to an image sensor, a reading device with the image sensor and a method for setting a particular mode of the image sensor, wherein the image sensor comprises a plurality of photoelectric converting elements for converting light signals into electric signals, and a group of channel select switches between a charge output unit of the photoelectric converting element and a common signal line capable of being sequentially turned on and off.

2. Description of Related Art

Image sensors are used in a reading device, such as a facsimile, a copy machine and a hand scanner, etc. FIG. 14 shows a structure of a conventional image sensor. Referring to FIG. 14, photoelectric converting elements P1$a$~P1$e$ are phototransistors, etc. for detecting light to output electric currents (image signals). P2 is a power input terminal for inputting a power voltage VDD. P3$a$~P3$e$ are channel select switches respectively connected to charge output units of the photoelectric converting elements P1$a$~P1$e$. P4 is a shift register group, wherein the shift register group P4 is activated by a start signal, image signals output from the photoelectric converting elements P1$a$~P1$e$ are sequentially output from an image signal output terminal P11 through a common signal line P7, and each channel select switch P3$a$~P3$e$ can be turned on and off sequentially according to the period of a clock pulse signal. P4$a$~P4$f$ are shift registers. P5 is a start signal input terminal for inputting the start signal (SI). P6 is a clock pulse signal input terminal for inputting the clock pulse signal (CLK).

After activated by the start signal SI, a flip-flop P8 continuously outputs an "ON" signal during an operation period of the shift register group P4, a period starting from inputting of the start signal SI to the shift register P4$a$ until the start signal SI is output from the shift register P4$f$. A chip select switch P9 is inserted onto a signal line P7, so that the chip select switch P9 is turned off upon receiving the "ON" signal from the flip-flop P8. A switch P10 is connected between the signal line P7 and a ground terminal P12 to repeatedly open and close according to a level change of the clock pulse signal CLK.

Next, the operation of the conventional image sensor is described. The start signal SI and the clock pulse signal are externally provided to the shift register group P4 through the start signal terminal P5 and the clock pulse signal input terminal P6, respectively. The period of start signal SI is twice of the period of the clock pulse signal CLK, and is read by the shift register P4$a$ of the shift register group P4 at the falling edge of the clock pulse signal CLK.

The shift register P4$a$ is activated by reading the start signal SI, and then the shift register P4$a$ closes the channel select switch P3$a$ for a time interval of one period of the clock pulse signal CLK. In this way, the image signal output from the photoelectric converting element P1$a$ is output from the image signal output terminal P11 through the signal line P7. Then, the channel select switch P3$a$ returns to its open status and the read start signal SI is transmitted to the shift register P4$b$.

Therefore, since the start signal SI is read by a shift register sequence of P4$b$→P4$c$→P4$d$→P4$e$, the image signals of the photoelectric converting elements P1$b$ to P1$e$ are sequentially output from the image signal output terminal P11. In addition, the output of the shift register P4$f$ is transmitted through the terminal P13 to serve as a start signal for the next-stage sensor IC.

In the aforementioned image sensor, the control signal externally input is used to selectively switch and output the current, which is output from the photoelectric converting element to the image signal output terminal, by determining whether the control signal is a high level (H) or a low level (L), and the resolution for reading is set to two levels. Refer to Japanese Laid Open Publication H05-227362.

However, in the conventional technology, it is necessary to input other control signals other than the start signal and the clock pulse signal both of which are dispensable to the control of the shift registers, and this would demand a need to arrange additional signal lines and thus increasing the cost. Japanese Laid Open Publication H2000-101803 discloses that the width of the start signal is changed according to a resolution to be set, and the resolution is switched between two levels according to status of the clock pulse signal ("H" or "L") after a predetermined time lapses from the falling edge of the start signal. However, as the width of the start signal is changed, a timing deviation might occur in controlling the shift registers.

SUMMARY OF THE INVENTION

According to the foregoing description, an object of this invention is to provide an image sensor, a reading device and a method for setting a particular mode, capable of setting every particular mode, such as resolution setting, etc., without increasing signal types to be input and without changing the width of the start signal.

In accordance with the object mentioned above, the present invention provides an image sensor. The image sensor comprises a plurality of photoelectric converting elements for converting optical signals to electric signals; a group of channel select switches, each channel select switch arranged between a charge output unit of each channel select switch and a signal line corresponding to each photoelectric converting element, wherein the group of the channel select switches can be turned on and off sequentially, synchronizing with an externally supplied clock pulse signal; and particular mode setting means, wherein when a clock pulse signal and a start signal with a fixed width are input, the particular mode setting means sets a particular mode under a specific combination pattern of the clock pulse signal and the start signal.

In the above image sensor, the group of the channel select switches, respectively arranged corresponding to each photoelectric converting element, can be turned on and off sequentially synchronizing with an externally supplied clock pulse signal. Therefore, the charge output unit of each photoelectric converting element is sequentially connected to the common signal line, and the image signal can be output through the common signal line.

In addition, when the clock pulse signal and the start signal with a fixed width are input, the particular mode setting means sets a particular mode under a specific combination pattern of the clock pulse signal and the start signal. Therefore, in one embodiment of the present invention, because the image sensor does not use signals other than the clock pulse signal and the start signal, and the width of the start signal is fixed at a fixed width, the particular mode can be set. Therefore, the cost can be controlled and a particular mode can be set. Additionally, when setting the particular mode, occurrence of a timing deviation at the channel select switch group can be prevented.

In the above image sensor, the particular mode can be a resolution setting mode, and the image sensor further comprises resolution setting means for setting a resolution in the resolution setting mode. In the image sensor control, the setting mode of the resolution is an important mode, and therefore it would be highly desirable that the resolution can be set when the start signal is input. In the embodiment of the present invention, the particular mode is the resolution setting mode, and the resolution setting means sets the resolution in the resolution setting mode. Therefore, the image sensor of the invention can achieve an unexpected effect.

Furthermore, in the above image sensor, when the resolution setting mode is set, the image sensor further comprises resolution setting period setting means for setting a resolution setting period, and wherein the resolution setting means sets the resolution in the resolution setting period that is set by the resolution setting period setting means.

When the resolution setting mode is set, the resolution setting period means sets the resolution setting period, and the resolution setting means sets the resolution in the resolution setting period. In this way, because a period where the resolution setting means has to set the resolution is set, the resolution setting means can suitably use the start signal in this period in the following manner to set the resolution. Therefore, by using the start signal, etc. in the resolution setting, influence on other controls can be reduced. Therefore, in addition to the above effects, malfunctions in other controls of the image sensor can be reduced by adopting a structure of setting the resolution during the resolution setting period.

In the above image sensor, the resolution setting means generates a resolution setting signal for setting the resolution according to status of the start signal in the resolution setting period. The status of the start signal in the resolution setting period can have many variations. Because the resolution setting means generates a resolution setting signal for setting the resolution according to status of the start signal in the resolution setting period, the resolutions can be respectively assigned to various status of the start signal in the resolution setting period. Therefore, the resolution can be set to multi-levels without increasing signal types.

In addition, the resolution setting means reads a plurality of status of the start signal synchronizing with the clock pulse signal in the resolution setting period, and then generates the resolution setting signal according to a combination of a read result.

In one embodiment of the image sensor of the invention, the resolution setting means reads a plurality of status of the start signal synchronizing with the clock pulse signal in the resolution setting period, and then generates the resolution setting signal according to a combination of a read result. In this way, when the status of the start signal is read synchronizing with the clock pulse signal, the process becomes very easy. Therefore, in addition to the above advantageous features, the image sensor can have the advantage of easy operation.

Furthermore, in one embodiment of the present invention, a resolution signal for indicating the resolution is included in an image signal output from the image sensor for each time when the resolution is changed. Because the resolution signal for indicating the resolution is included in an image signal output from the image sensor for each time when the resolution is changed, setting a wrong resolution can be externally detected by referring to the resolution signal. Therefore, in addition to the above advantageous features, the image sensor is capable of outputting an error message when a wrong resolution is set.

The present invention further provides a reading device having the image sensor described above. The reading device comprises clock pulse signal generating means for generating the clock pulse signal; start signal generating means for generating the start signal; and control means for controlling the clock pulse signal generating means and the start signal generating means according to a particular mode.

In the above reading device, the control means controls the clock pulse signal generating means and the start signal generating means according to a particular mode. The signals (the clock pulse signal and the start signal) generated by the aforementioned signal generating means are input to the image sensor. Therefore, the aforementioned image sensor can set the particular mode by the control implemented by the control means.

Furthermore, in the above reading device, the particular mode can be a resolution setting mode, and the image sensor further comprises resolution setting means for setting a resolution in the resolution setting mode. In the image sensor control, the setting mode of the resolution is an important mode, and it would be highly desirable to set the resolution when the start signal is input. In the embodiment of the present invention, the particular mode is the resolution setting mode, and the resolution setting means sets the resolution in the resolution setting mode. Therefore, the image sensor of the invention can achieve an unexpected effect.

In addition, in the above reading device, when the resolution setting mode is set, the image sensor further comprises resolution setting period setting means for setting a resolution setting period, and wherein the resolution setting means sets the resolution in the resolution setting period that is set by the resolution setting period setting means.

When the resolution setting mode is set, the resolution setting period means sets the resolution setting period, and the resolution setting means sets the resolution in the resolution setting period. In this way, because a period where the resolution setting means has to set the resolution is set, the resolution setting means can suitably use the start signal in this period in the following manner to set the resolution. Therefore, by using the start signal, etc. in the resolution setting period, influence on other controls can be reduced. Therefore, in addition to the above advantageous features, malfunctions in other controls of the reading device can be reduced by adopting a structure of setting the resolution in the resolution setting period.

Moreover, the clock pulse signal generating means further comprises period changing means for changing a period of the clock pulse signal from a first period for a reading operation of the image sensor to a second period that is different from the first period, and wherein when the particular mode setting is performed by the control means, the period changing means changes the clock pulse signal to a clock pulse signal corresponding to the second period.

When the setting the particular mode is performed, the period of the clock pulse signal is changed by the period changing means from a first period for a reading operation of the image sensor to a second period that is different from the first period. Therefore, setting of the particular mode can be performed more precisely.

Moreover, in the above reading device, the particular mode setting due to the particular mode setting means is performed for each page for reading an image. Because the particular mode setting process is performed for every page for reading an image, the frequency in setting the particular mode is reduced compared to the case that setting the particular mode is performed for every line. Therefore, the image reading can be accelerated.

The present invention further provides a method for setting a particular mode suitable for an image sensor. The image sensor comprises a plurality of photoelectric converting elements for converting optical signals to electric signals; a group of channel select switches, each channel select switch arranged between a charge output unit of each channel select switch and a signal line corresponding to each photoelectric converting element, wherein the group of the channel select switches can be turned on and off sequentially synchronizing with an externally supplied clock pulse signal. The method comprises a step of setting a particular mode under a specific combination pattern of the clock pulse signal and the start signal when a clock pulse signal and a start signal with a fixed width are input.

In the above method for setting a particular mode suitable for the image sensor, the group of the channel select switches that are respectively arranged corresponding to each photoelectric converting element can be turned on and off sequentially synchronizing with an externally supplied clock pulse signal. Therefore, the charge output unit of each photoelectric converting element can be sequentially connected to the common signal line, and the image signal can be output through the common signal line.

In the aforementioned method, when the clock pulse signal and the start signal with a fixed width are input, the particular mode setting means sets a particular mode under a specific combination pattern of the clock pulse signal and the start signal. Therefore, in one embodiment of the present invention, because the image sensor does not use signals other than the clock pulse signal and the start signal, and the width of the start signal is fixed at a fixed width, the particular mode can be set. Therefore, the cost can be controlled and a particular mode can be set. Additionally, when setting the particular mode, occurrence of a timing deviation at the channel select switch group can be reduced.

In one embodiment of the invention, the particular mode can be a resolution setting mode, and a resolution is set in the resolution setting mode. In the image sensor control, the setting mode of the resolution is an important mode, and therefore it is highly desirable to set the resolution when the start signal is input. In the embodiment of the present invention, the particular mode is the resolution setting mode, and the resolution setting means sets the resolution in the resolution setting mode. Therefore, the image sensor of the invention can achieve an unexpected effect.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings.

DESCRIPTION OF THE PREFERRED EMBODIMENT

Figure 1:
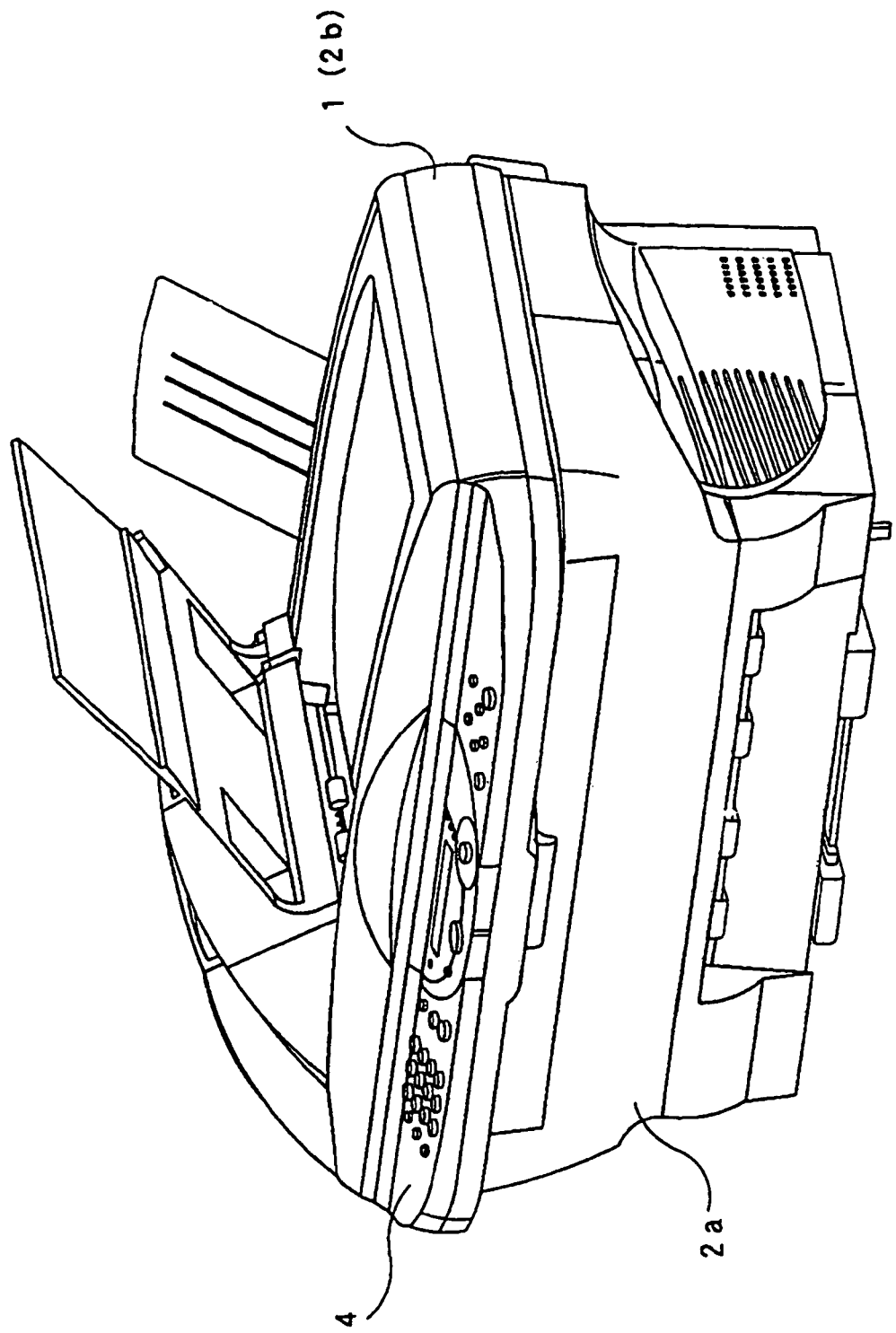
FIG. 1 shows an overall structure of a multifunction device according to the first embodiment of the present invention.

The image sensor, the reading device and the method for setting the resolution according to the invention will be described in detail hereinafter with reference to the accompanying drawings. FIG. 1 shows an overall structure of a multifunction machine comprising a reading device 1 of the first embodiment is described. The multifunction machine comprises an openable clam-shell mechanism where an upper body 2b is openably assembled to a lower body 2a, and the reading device 1 is included in the upper body 2b. An operation panel 4 is arranged at the front side of the upper body 2b. In addition, the multifunction machine is also equipped with an image forming device, such as a laser printer or an inject printer, etc., but its related description is omitted because there is no direct relationship between them.

Figure 2:
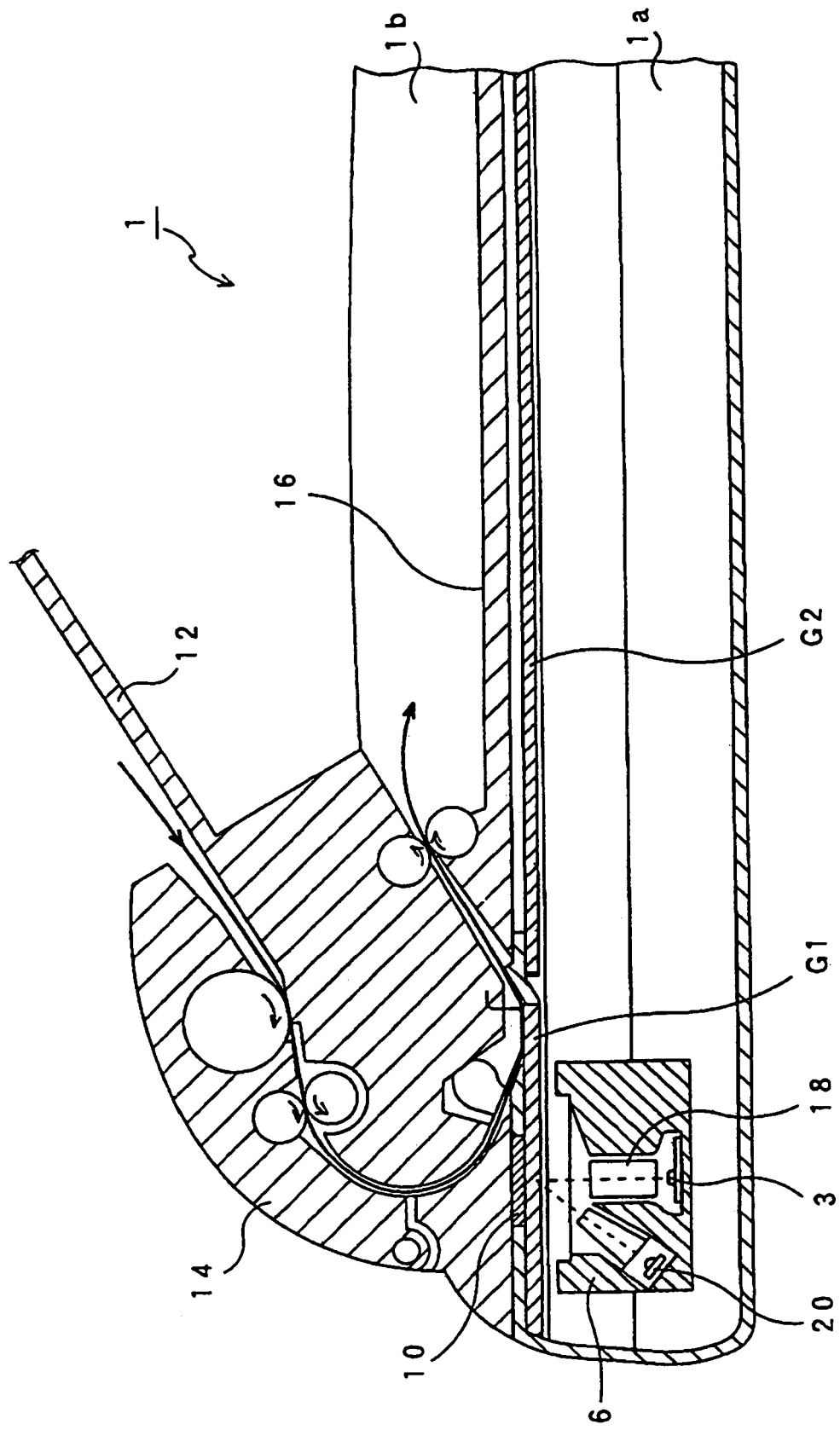
FIG. 2 shows a structure of a reading device according to the first embodiment of the present invention.

As shown in FIG. 2, the reading device 1 includes a flat bed (FB) type mechanism and an auto document feed (ADF) type mechanism. The reading device 1 also comprises an openable clam-shell mechanism where a cover portion 1b is openably assembled to a flat bed 1a. In the reading device 1, a reading head 6, a first platen glass G1, a second platen glass G2, a white board 10, etc. are arranged in the flat bed unit 1a. A document supply tray 12, a document transporting device 14 and a document discharging tray 16, etc. are arranged in the cover unit 1b.

The reading head 6 comprises an image device 2, a SELFOC lens 18 and a light source 20, and light from the light source 20 irradiates a document placed at a location of a reading object. The light reflected from the document is imaged on the image device 3 by the SELFOC lens 18, so that the image can be read by the image device 3. In FIG. 2, the reading head 6 is located at a standby position. When using the FB or the ADF to read the document, the reading head 6 moves to the respective reading start position.

Figure 3:
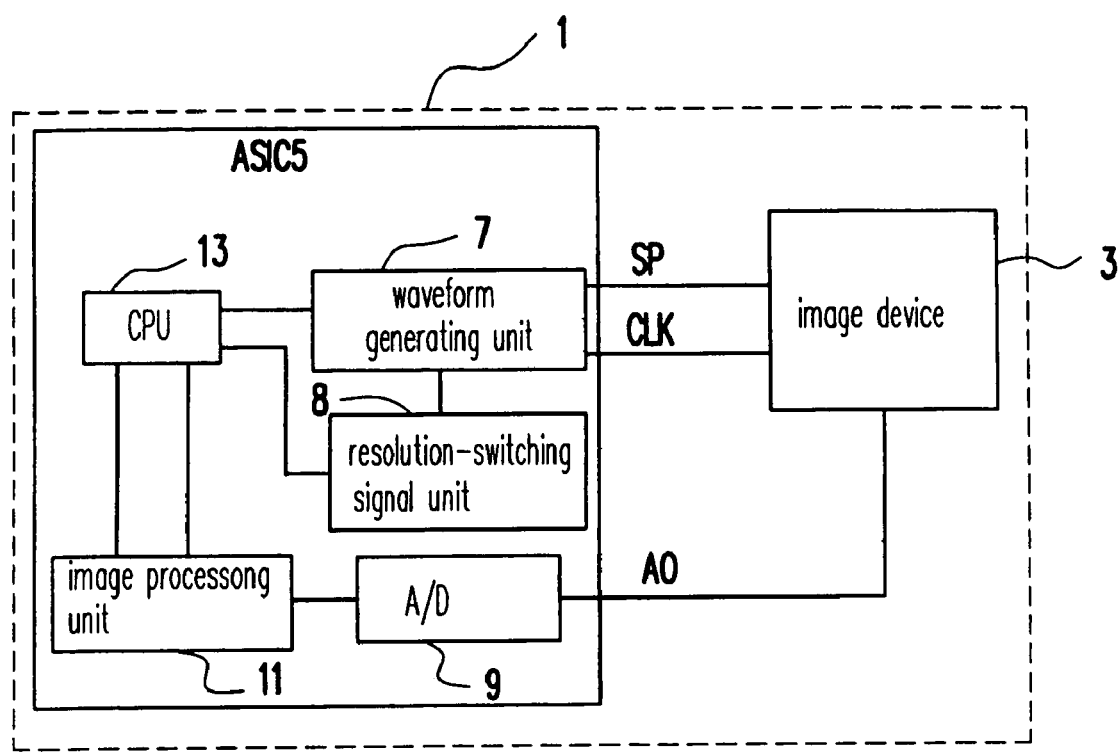
FIG. 3 chows a control system of the reading device according to the first embodiment of the present invention.

FIG. 3 is a block diagram used to describe the configuration of a control system of the reading device 1. Referring to FIG. 3, the reading device 1 comprises an image device (for example, an image sensor) 3 for reading an image, and an ASIC 5 for controlling the image device 3 and processing image signals input from the image device 3.

The structure of the image device 3 will be described later. The ASIC 5 comprises a waveform generating unit 7 (means for generating a resolution assignment timing signal, means for generating a resolution assignment period setting signal), a resolution switching signal unit (means for generating a resolution assignment signal) 8, an A/D converting unit 9, an image processing unit 11 and a central processing unit (CPU, control means) 13.

The waveform generating unit 7 generates a start signal SP and a clock pulse signal CLK respectively to the image device 3. The resolution switching signal unit 8 generates a mode signal MODE (a control signal for assigning a resolution) to the image device 3. The A/D converting unit converts an analog image signal transmitted from the image device 3 into a digital signal, and then the digital signal is output to the image processing unit 11. In addition, the CPU 13 controls each unit of the ASIC 5.

Figure 4:
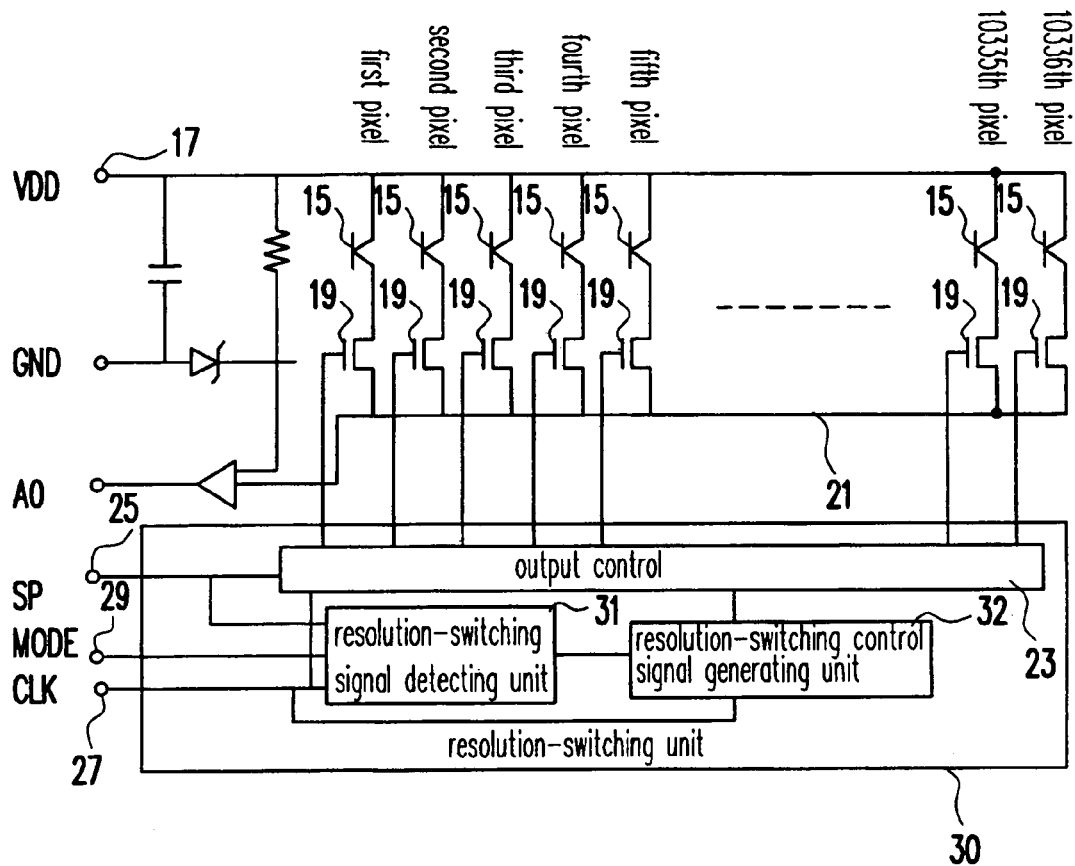
FIG. 4 shows a structure of an image device according to the first embodiment of the invention.
Figure 4:
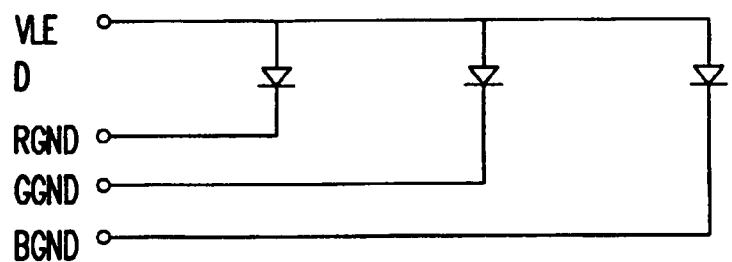
Figure 5:
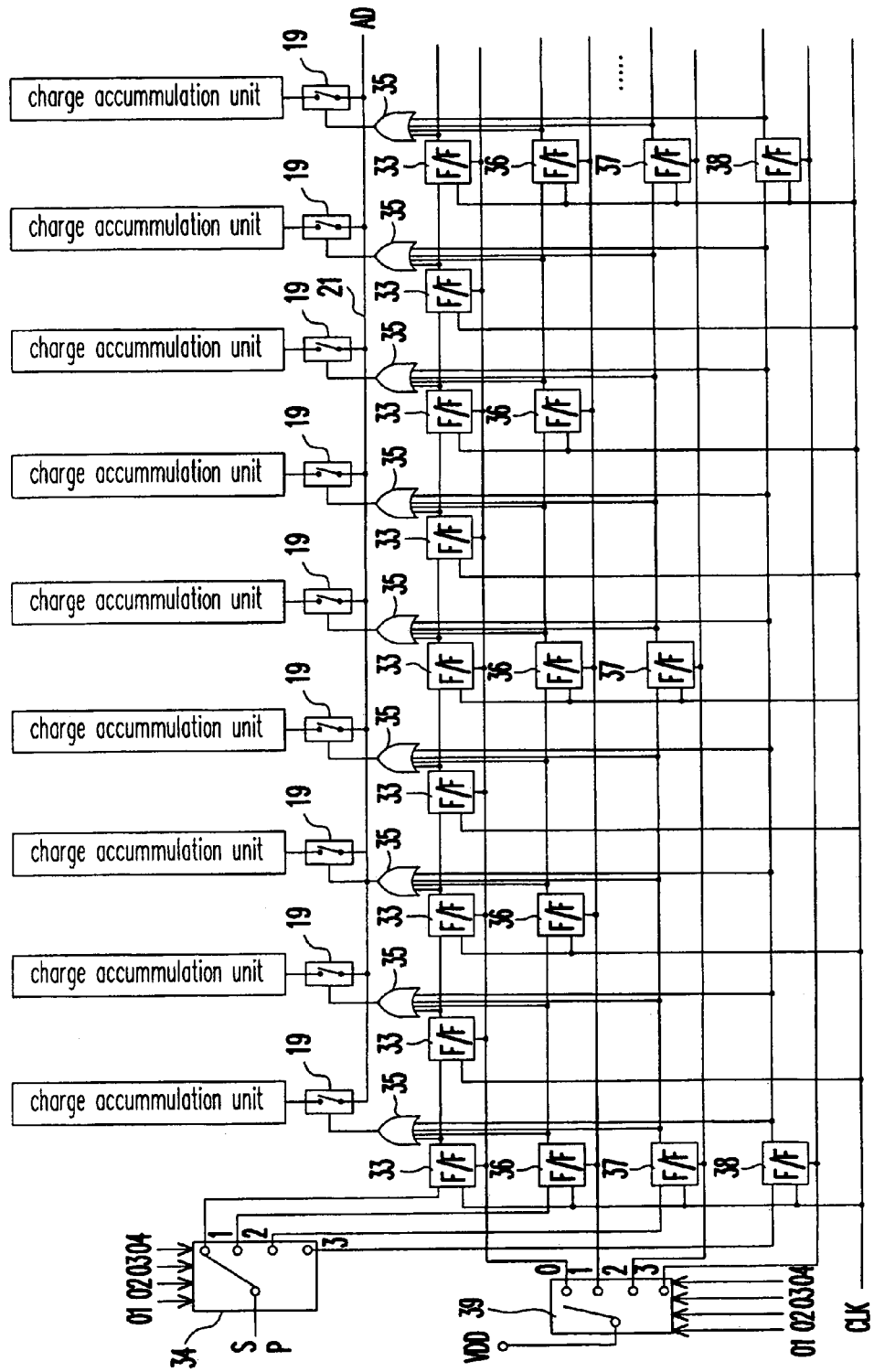
FIG. 5 shows a structure of an output control unit according to the first embodiment of the present invention.
Figure 6:
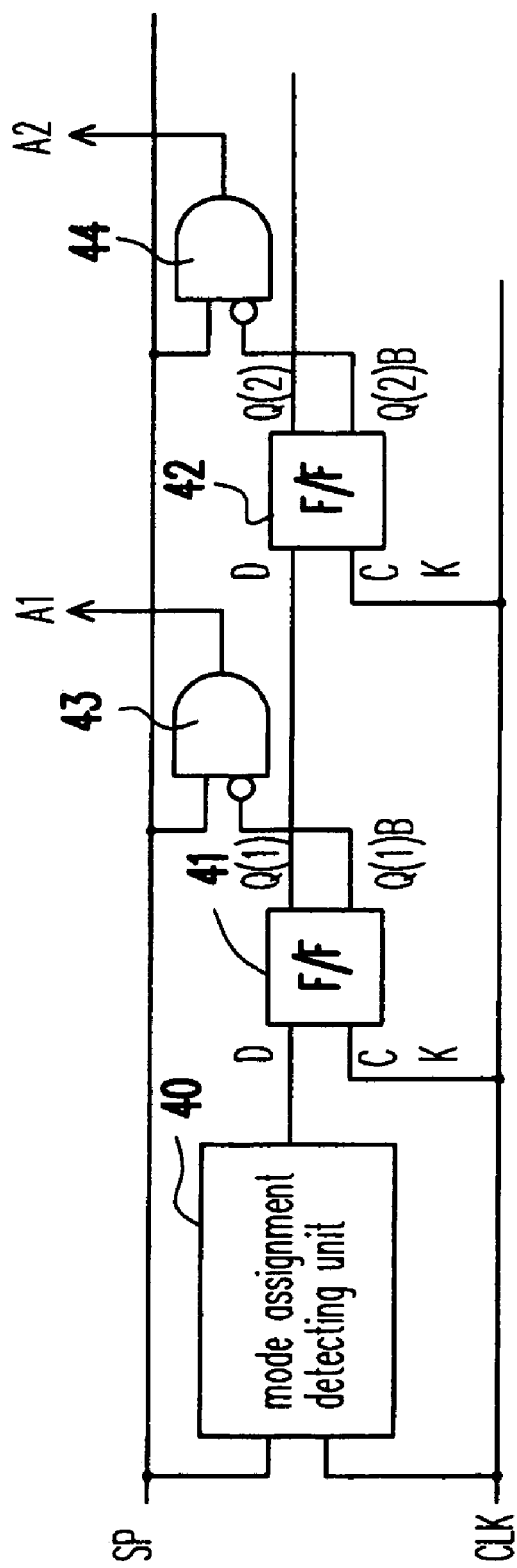
FIG. 6 shows a structure of a resolution-switching signal detecting unit according to the first embodiment of the present invention.

The structure and operation of the image device 3 is described in detail with the accompanying drawings FIGS. 4 to 6. In FIG. 4, photoelectric converting elements 15 are constructed of thin film photodiodes or photoconductive thin film, for example. The photoelectric converting elements 15 forms a density corresponding to 1200 dpi and 10336 elements 15 are arranged on one line, which are sequentially numbered form the first pixel to the 10336th pixel. Each photoelectric converting element 15 is connected to a common electrode 17 where a bias voltage VDD is applied therethrough. In FIG. 4, a capacitor for accumulating charges, corresponding to each photoelectric converting element 15, is omitted.

Analog switches (channel select switches) 19 are arranged respectively corresponding to the photoelectric converting elements 15. Each analog switch 19 between an output terminal (charge output unit) of the photoelectric converting element 15 and an AO terminal 21 is turned on and off (common signal line, i.e., a signal output terminal).

An output control unit 23 is activated by the start signal SP synchronizing with the clock pulse signal, and sequentially outputs a signal to the gates of the analog switches 19, so as to control the on and off status of the analog switches 19. The output control unit 23 is constructed as a shift register, and forms a resolution switching unit 30 together with a resolution-switching signal detecting unit 31 and a resolution-switching control signal generating unit 32. In the resolution switching unit 30, on-off control patterns of the analog switches 19 can be switched to read the image with a resolution that is assigned from four resolutions of 1200 dpi, 600 dpi, 300 dpi and 150 dpi. The detail structure and operation of the output control unit 23 will be described later.

An SP terminal 25 is adapted for inputting the start signal SP generated at the waveform generating unit 7 of the ASIC 5 to the output control unit 23 and the resolution-switching signal detecting unit 31. A CLK terminal 27 is adapted for inputting the clock pulse signal CLK generated at the waveform generating unit 7 of the ASIC 5 to the resolution-switching signal detecting unit 31 and the resolution-switching control signal generating unit 32.

The resolution-switching signal detecting unit 31 is adapted for detecting the resolution-switching signal for setting the resolution of the image device 3. A mode signal determining unit 32a is adapted for determining a mode (indicated resolution) according to the resolution-switching signal detected by the resolution-switching signal detecting unit 31. A mode latch unit 32b is adapted for latching a determined result of the mode signal determining unit 32a. The mode latch unit 32a outputs a signal corresponding to a resolution of any one of 1200 dpi, 600 dpi, 300 dpi and 150 dpi, to the output control unit 23 for each line.

FIG. 5 is an exemplary block diagram used to describe the structure of the output control unit. In FIG. 5, flip flops (F/F) 33 are individually arranged corresponding to the respective photoelectric converting elements 15. The clock pulse signal CLK is supplied to each flip flop (F/F) 33. In addition, the start signal SP is supplied to the first flip flop 33 through a switch 34. As the start signal SP is input, the flip flops (F/F) 33 are activated in turn, and the analog switch 19 connected though an OR gate 35 is closed for a time interval of one period of the clock pulse signal CLK. Therefore, a resolution of 1200 dpi can be implemented by the operation of the flip flops (F/F) 33.

In other words, the start signal SP input to the first flip flop (F/F) 22 is synchronized with the clock pulse signal CLK, and then transmitted to the second, the third, . . . and the 10336th flip flops (F/F) 33 in turn. Since the flip flops (F/F) 33 respectively make the corresponding analog switches to close for a time interval of one period of the clock pulse signal CLK, the photoelectric converting elements 15 from the first to the 10336th in turn release charges to the AO terminal 21. The charges transmitted to the AO terminal 21 are transmitted to the A/D converting unit 9 of the ASIC 5, serving as an analog image signal. As the photoelectric converting elements 15 from the first to the 10336th release charges, reading of the first line is completed. By repeating the above reading operation for a predetermined number of lines, the document is read with a resolution of 1200 dpi in the main scan direction.

Flip flops (F/F) 36 are arranged corresponding to each set consisting of two adjacent photoelectric converting elements 15, i.e., sets of the first and the second elements 15, the third and the fourth elements 15, . . . , and the 10335th and the 10336th elements 15. The same clock pulse signal CLK provided to the flip flops (F/F) 33 is also provided to each flip flop (F/F) 36. The start signal SP is supplied to the first flip flop (F/F) 36 through the switch 34. As the start signal SP is input, each flip flop (F/F) 36 is sequentially activated, and two analog switches 19 connected though the OR gates 35 are simultaneously closed for a time interval of one period of the clock pulse signal CLK. Therefore, a resolution of 600 dpi can be implemented by the operation of the flip flops (F/F) 36. Namely, of the photoelectric converting elements 15 from the first to the 10336th, sequentially, every two adjacent photoelectric converting elements 15 release charges at the same time, i.e., the first and the second elements 15, the third and the fourth elements 15, . . . , and the 10335th and the 10336th elements 15. The charges transmitted to the AO terminal 21 are transmitted to the A/D converting unit 9 of the ASIC 5, serving as an analog image signal. As the photoelectric converting elements 15, from the first one to the 10336th one, release charges, and the reading of the first line is completed. By repeating the above reading operation for a predetermined number of lines, the document is read with a resolution of 600 dpi in the main scan direction.

Flip flops (F/F) 37 are arranged corresponding to each set consisting of four adjacent photoelectric converting elements 15, i.e., sets of the first to the fourth elements 15, the fifth to the eighth elements 15, . . . , and the 10333rd to the 10336th elements 15. The same clock pulse signal CLK provided to the flip flops (F/F) 33, 36 is also provided to each flip flop (F/F) 37. The start signal SP is supplied to the first flip flop (F/F) 37 through the switch 34. As the start signal SP is input, each flip flop (F/F) 37 is sequentially activated, and four analog switches 19 connected though the OR gates 35 are simultaneously closed for a time interval of one period of the clock pulse signal CLK. Therefore, a resolution of 300 dpi can be implemented by the operation of the flip flops (F/F) 37. Namely, of the photoelectric converting elements 15 from the first to the 10336th, sequentially, every four adjacent photoelectric converting elements 15 release charges to the AO terminal 21 at the same time, i.e., the first to the fourth elements 15, the fifth to the eighth elements 15, . . . and so on. The charges transmitted to the AO terminal 21 are transmitted to the A/D converting unit 9 of the ASIC 5, serving as an analog image signal. As the photoelectric converting elements 15 from the first to the 10336th release charges, the reading of the first line is completed. By repeating the above reading operation for a predetermined number of lines, the document is read with a resolution of 300 dpi in the main scan direction.

Flip flops (F/F) 38 are arranged corresponding to each set consisting of eight adjacent photoelectric converting elements 15, i.e., sets of the first to the eighth elements 15, the ninth to the sixteenth elements 15, . . . , and the 10329th to the 10336th elements 15. The same clock pulse signal CLK provided to the flip flops (F/F) 33, 36, 37 is also provided to each flip flop (F/F) 38. The start signal SP is supplied to the first flip flop (F/F) 38 through the switch 34. As the start signal SP is input, each flip flop (F/F) 38 is sequentially activated, and eight analog switches 19 connected though the OR gates 35 are simultaneously closed for a time interval of one period of the clock pulse signal CLK. Therefore, a resolution of 150 dpi can be implemented by the operation of the flip flops (F/F) 38. Namely, of the photoelectric converting elements 15 from the first to the 10336th, sequentially, every eight adjacent photoelectric converting elements 15 release charges to the AO terminal 21 at the same time, i.e., the first to the eighth elements 15, the ninth to the sixteenth elements 15, . . . and so on. The charges transmitted to the AO terminal 21 are transmitted to the A/D converting unit 9 of the ASIC 5, serving as an analog image signal. As the photoelectric converting elements 15 from the first to the 10336th release charges, the reading the first line is completed. By repeating the above reading operation for a predetermined number of lines, the document is read with a resolution of 150 dpi in the main scan direction.

According to whether any one of the resolution-switching control signals Q1 to Q4 input from the resolution-switching control signal generating unit 32 is "H (high level)", the switch 34 switches to input the start signal SP to one of the flip flop (F/F) sets 33, 36, 37 and 38. In addition, a bias voltage VDD is also applied to each of the flip flops (F/F) 33, 36, 37 and 38 through a switch 39. The switch 39 also switches according to the resolution-switching control signals Q1 to Q4 so as to only apply the bias voltage VDD to one of the flip flop (F/F) sets 33, 36, 37 and 38, to which the switch 34 inputs the start signal SP. The switch 39 is to enable one of the flip flop (F/F) sets 33, 36, 37 and 38 according to the resolution-switching control signals Q1 to Q4.

FIG. 6 is a block diagram to describe the structure and operation of the resolution-switching signal detecting unit 31. Referring to FIG. 6, the resolution-switching signal detecting unit 31 comprises A MODE ASSIGNMENT DETECTING UNIT 40, a flip flop (F/F) 41, a flip flop (F/F) 42, an AND gate 43 and an AND gate 44. In comparison with the start signal SP and the clock pulse signal CLK, the mode assignment detecting unit 40 detects a mode assignment where two or more pulses of the clock signal CLK occur during the "H" period of the start signal SP (refer to FIG. 7), and then generates pulses. This circuit, for example, can be suitably constructed by a counter, etc. for counting a pulse number pf the clock signal CLK during the "H" period of the start signal SP. When a counter that outputs binary digits is used, pulses can be output by latching a signal that indicates values of assigned digits.

The clock pulse signal CLK is also input to the flip flops (F/F) 41, 42. As the output signal of the mode assignment detecting unit 40 is input to the first flip flop (F/F) 41, the output changes synchronizing with the clock pulse signal CLK.

The mode signal determining unit 32a is constructed by a proper combination of logic circuits and generates the resolution-switching control signals Q1 to Q4 corresponding to the resolution-switching signals A1, A2 based on the following TABLE 1. Additionally, in the mode latch unit 32b, the resolution-switching signals A1, A2 are input from the resolution-switching signal detecting unit 31 to the mode signal determining unit 32a, and the previous values of resolution-switching control signals Q1 to Q4 are latched until the next resolution-switching control signals Q1 to Q4 is input from the mode signal determining unit 32a.

TABLE 1

| A1 | A2 | resolution | Q1 | Q2 | Q3 | Q4 |
|----|----|-----------|----|----|----|----|
| H  | L  | 1200 dpi  | H  | L  | L  | L  |
| L  | H  | 600 dpi   | L  | H  | L  | L  |
| H  | H  | 300 dpi   | L  | L  | H  | L  |
| L  | L  | 150 dpi   | L  | L  | L  | H  |

H: high level,
L: low level

When the resolution-switching control signal Q1 is "H" and the other resolution-switching control signals Q2 to Q4 are "L", the switches 34, 39 of the output control unit 32 switch to the terminal "0" as shown in FIG. 5. Then, the image is read with a resolution of 1200 dpi by using the flip flops (F/F) 33. Similar to other cases, when only the resolution-switching control signal Q2 is "H" and the others are "L", the switches 34, 39 of the output control unit 32 switch to the terminal "1" and a resolution of 600 dpi can be implemented by the flip flops (F/F) 36. When only the resolution-switching control signal Q3 is "H" and the others are "L", the switches 34, 39 of the output control unit 32 switch to the terminal "2" and a resolution of 300 dpi can be implemented by the flip flops (F/F) 37. When only the resolution-switching control signal Q4 is "H" and the others are "L", the switches 34, 39 of the output control unit 32 switch to the terminal "3" and a resolution of 150 dpi can be implemented by the flip flops (F/F) 38. Furthermore, at the switch 34, the signal of any one of the terminal "0" to "3" is connected according to the signal from the mode latch unit 32b.

In the embodiment of the above structure, the resolution switch can be performed in the following manner. As shown in a timing diagram in FIG. 7, when two or more pulses of the clock pulse signal CLK occur during the "H" period of the start signal SP, an interval of two periods of the clock pulse signal CLK from the falling edge of the start signal SP is set as a mode setting period (a resolution setting period). This mode setting period can be randomly set by software. When the start signal SP detected synchronizing with the rising edge of the clock pulse signal CLK in the mode setting is "H" and "L" respectively, a resolution of 1200 dpi can be assigned. Similarly, a resolution of 600 dpi, 300 dpi, and 150 dpi can be respectively assigned when the detected start signal SP is "L, H", "H, H", and "L, L".

Figure 7:
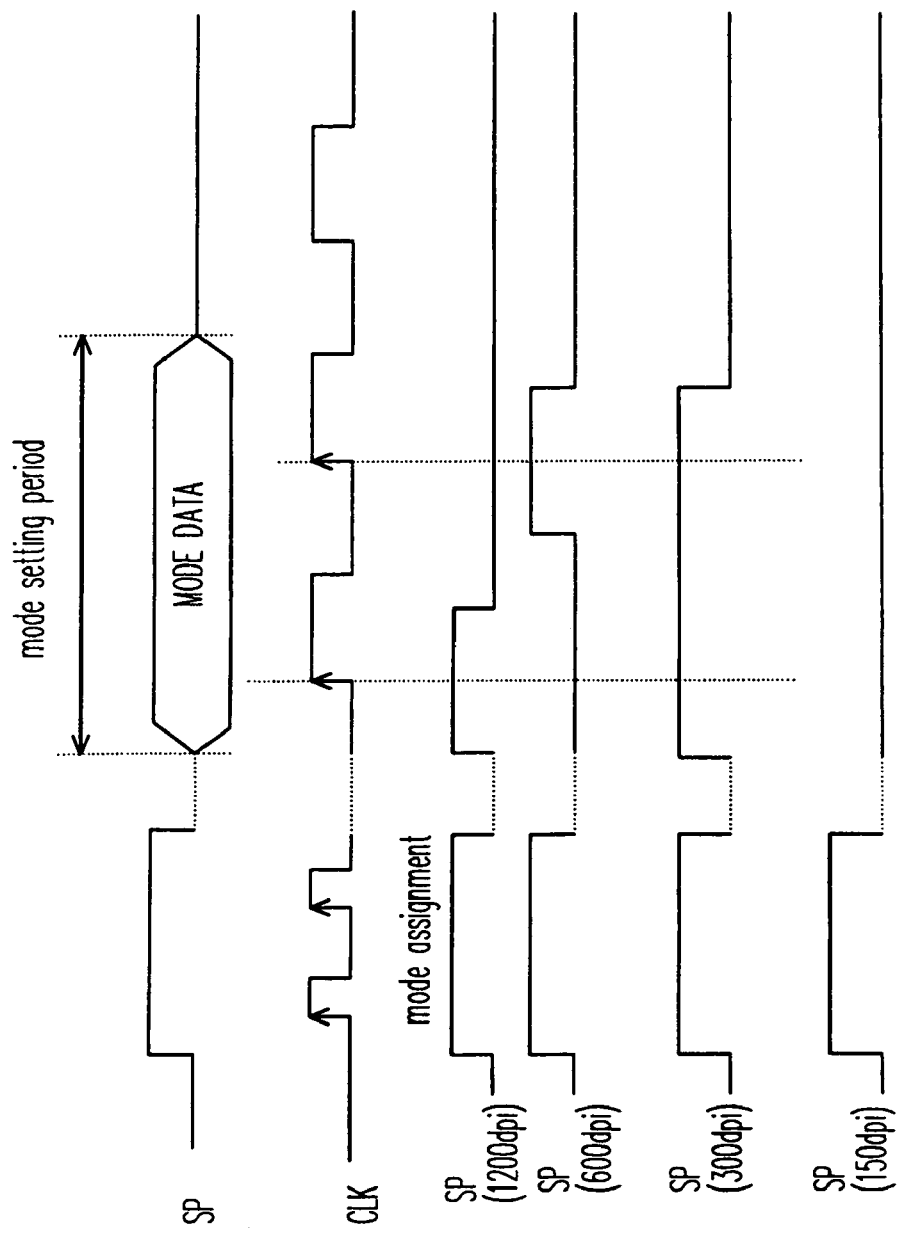
FIG. 7 is a timing diagram showing the resolution setting according to the first embodiment of the present invention.
Figure 8:
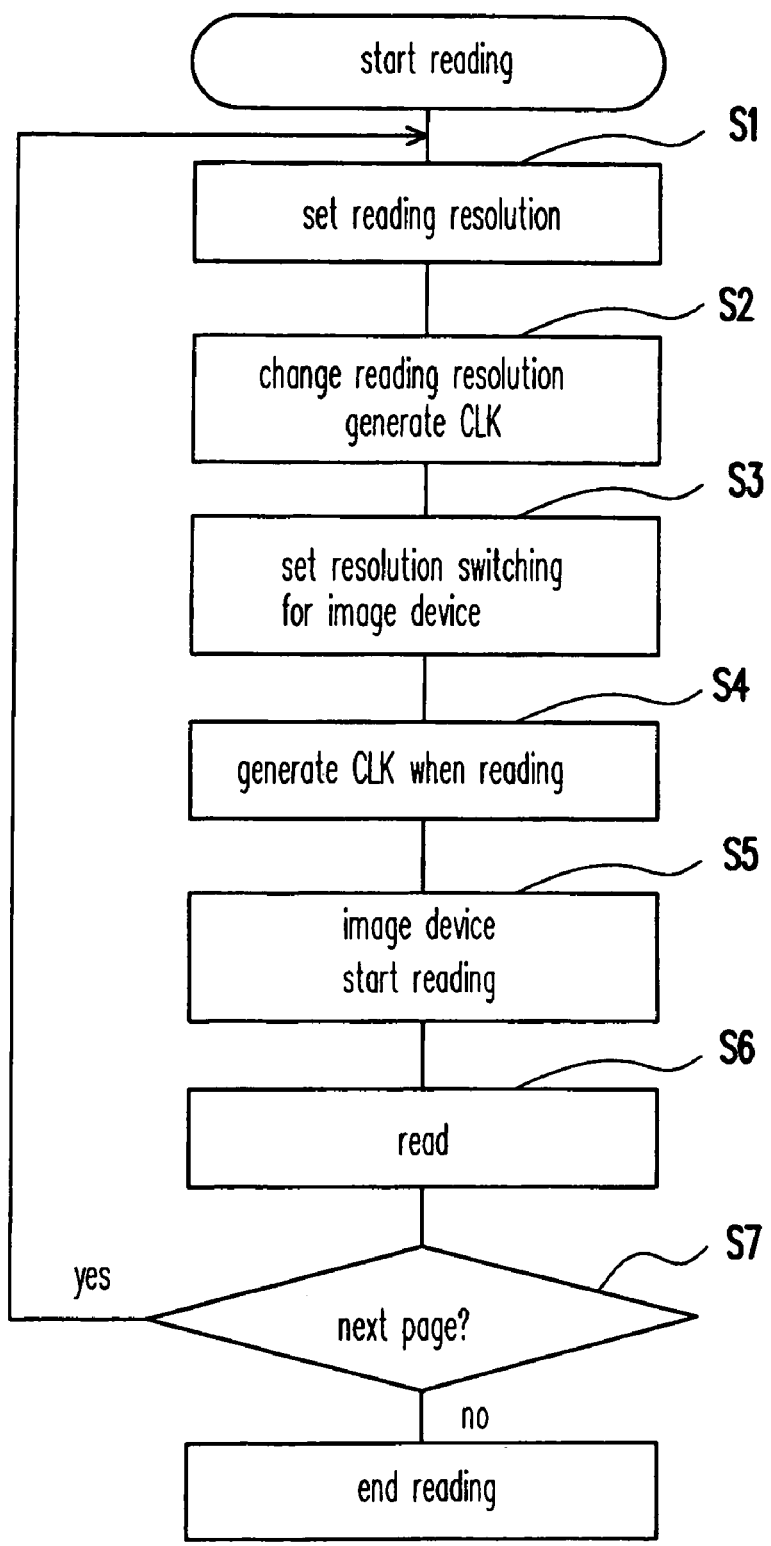
FIG. 8 is a flow chart showing the reading process according to the first embodiment of the present invention.

The CPU 13 controls the resolution-switching signal unit 8 by the following process according to a resolution indicated by a user's operation of the operation panel 4, so that the waveform generating unit 7 generates the proper start signal SP and clock pulse signal CLK as shown in FIG. 7 and then provides to the image device 3. FIG. 8 is a flow chart showing a process executed by the CPU 13.

As shown in FIG. 8, as the process starts, the CPU 13 sets a read resolution according to an operation status of the operation panel 4 at step S1. Next, at step S2, a clock pulse signal CLK with a period half of a usual reading operation is generated by the waveform generating unit 7.

Next, at step S3, the resolution of the image sensor 3 is switched and set by generating suitable start signal SP in the aforementioned mode setting period. The clock pulse signal CLK for the usual reading is generated at step S4. Accordingly, the image device 3 begins reading at step S5. Next, at step S6, one page image is read by scanning one line at a time, and whether there is another page for reading is determined at step S7. When there is another page (YES at step S7), the process returns to step S1 to read the next page. When no more pages for reading is determined at step S7 (NO at step S7), the process ends.

As described in the embodiment, the resolution can be set to four levels by only using the start signal SP and the clock pulse signal CLK both of which are indispensable to the control of the shift registers (the output control unit 23). Therefore, the signal line number in the reading device 1 is reduced, and the cost can be effectively reduced. Moreover, since the width of the start signal SP is fixed at a fixed width, occurrence of a timing deviation during the operation of the output control unit 23 can be reduced. In the embodiment, because a prescribed mode setting period is set and the resolution is set at that period, even though the start signal SP is used to set the resolution in the above manner, the possibility of malfunctions of other controls can be substantially reduced and therefore one need not worry that malfunctioning of other controls may occur.

Further, if increasing number of the flip flops (F/F) and the AND gates of the resolution-switching signal detecting unit 31, by extending the mode setting period up to three or more periods of the clock pulse signal CLK, various resolutions can be set without increasing signals provided to the image device 3.

Figure 9:
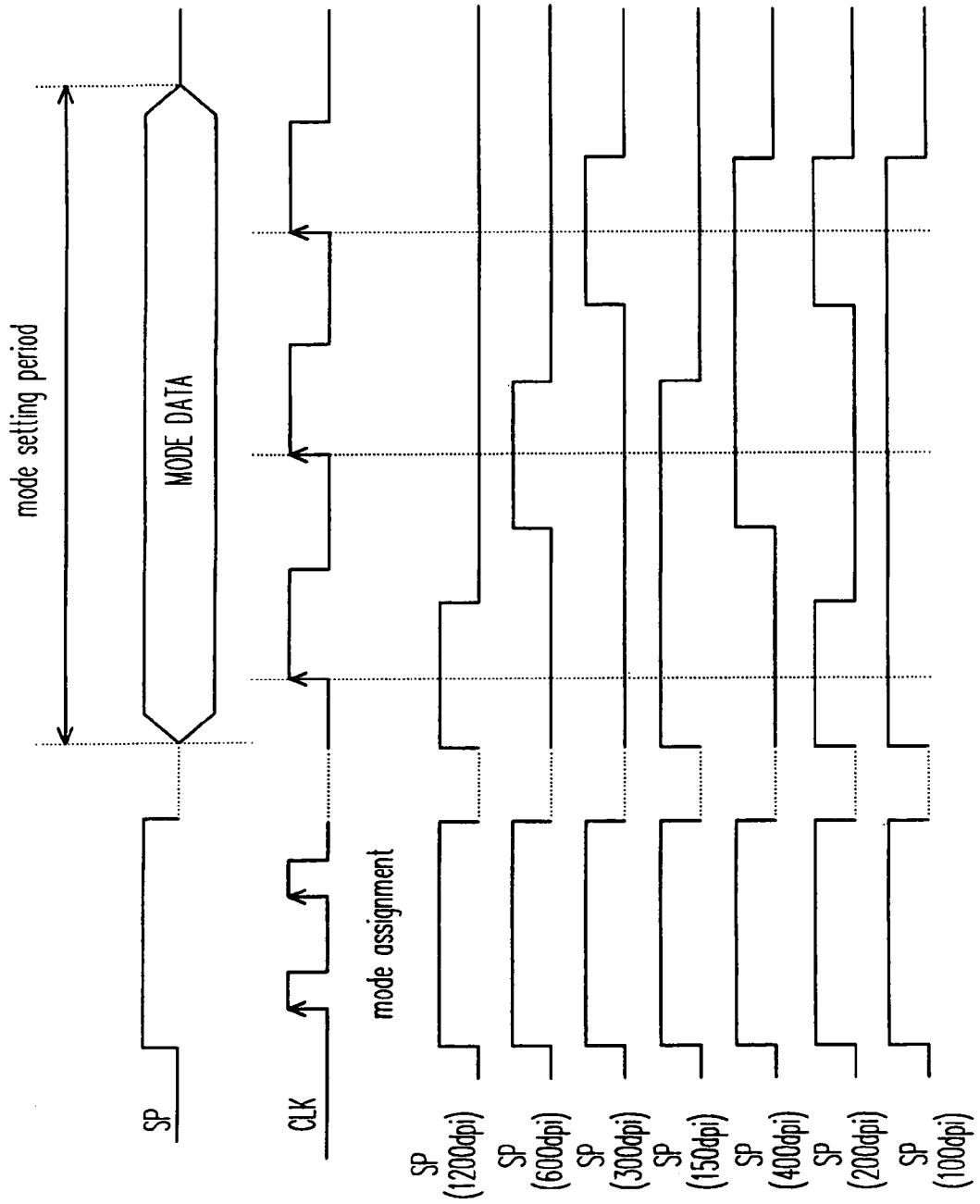
FIG. 9 is a timing diagram showing the resolution setting according to the second embodiment of the present invention.

In the second embodiment shown in FIG. 9, when the start signal SP detected synchronizing with the rising edges of the clock pulse signal CLK is "H", "L", "L" respectively, the resolution is assigned to 1200 dpi. Similarly, "L, H, L" is assigned to 600 dpi, "L, L, H" is assigned to 300 dpi, "H, H, L" is assigned to 150 dpi, "L, H, H" is assigned to 400 dpi, "H, L, H" is assigned to 200 dpi, and "H, H, H" is assigned to 100 dpi.

In addition, in order to implement resolutions of 400 dpi, 200 dpi, etc., it is necessary to add flip flops (F/F) or other switches to be able to close the analog switches 19 for every three or six switches. Since this structure can be easily modified according to FIG. 5, and therefore a detail description thereof omitted herein. Furthermore, the start signal SP can be also detected synchronizing with the falling edge of the clock pulse signal CLK.

Figure 10:
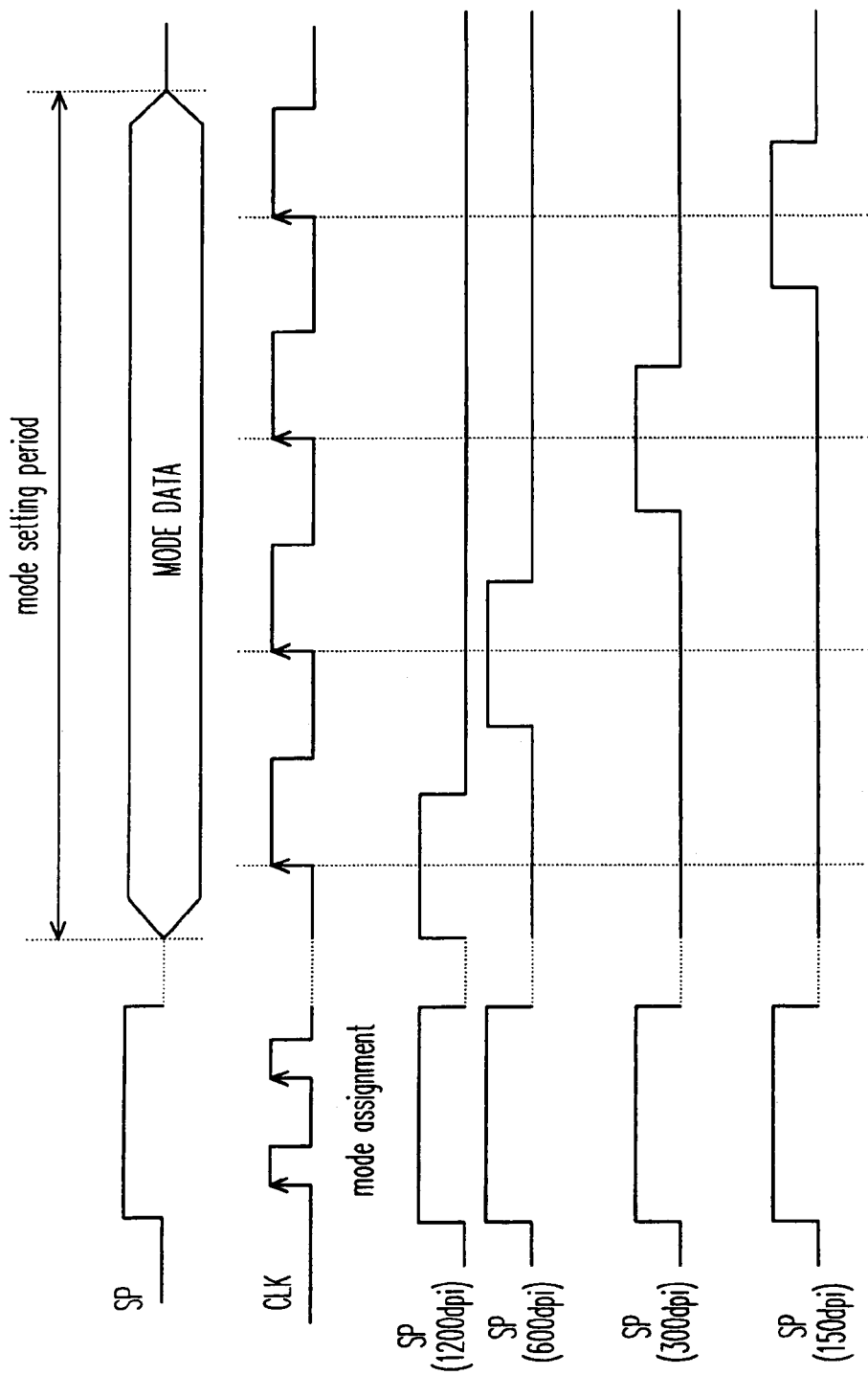
FIG. 10 is a timing diagram showing the resolution setting according to the third embodiment of the present invention.

In the third embodiment shown in FIG. 10, when the start signal SP detected synchronizing with the rising edges of the clock pulse signal CLK is "H", "L", "L", "L" respectively, the resolution is assigned to 1200 dpi. Similarly, "L, H, L, L" is assigned to 600 dpi, "L, L, H, L" is assigned to 300 dpi, "L, L, L, H" is assigned to 150 dpi. Namely, in the third embodiment, the resolution can be determined by determining that "H" is detected at which timing of the clock pulse signal CLK.

In this case, if the start signal SP detected at the first timing of the clock pulse signal CLK is "H", at this time the resolution can be affirmatively determined as 1200 dpi. Similarly, if the start signal SP detected at the first and the second timings of the clock pulse signal CLK is "L" and "H" respectively, at this time the resolution can be affirmatively determined as 600 dpi. If the start signal SP detected at the first, the second and the third timings of the clock pulse signal CLK is "L", "L" and "H" respectively, at this time the resolution can be affirmatively determined as 300 dpi. In this way, when the resolution is affirmatively determined in the middle of the mode setting period, the mode switching period can be directly ended to begin reading the image immediately.

Figure 11:
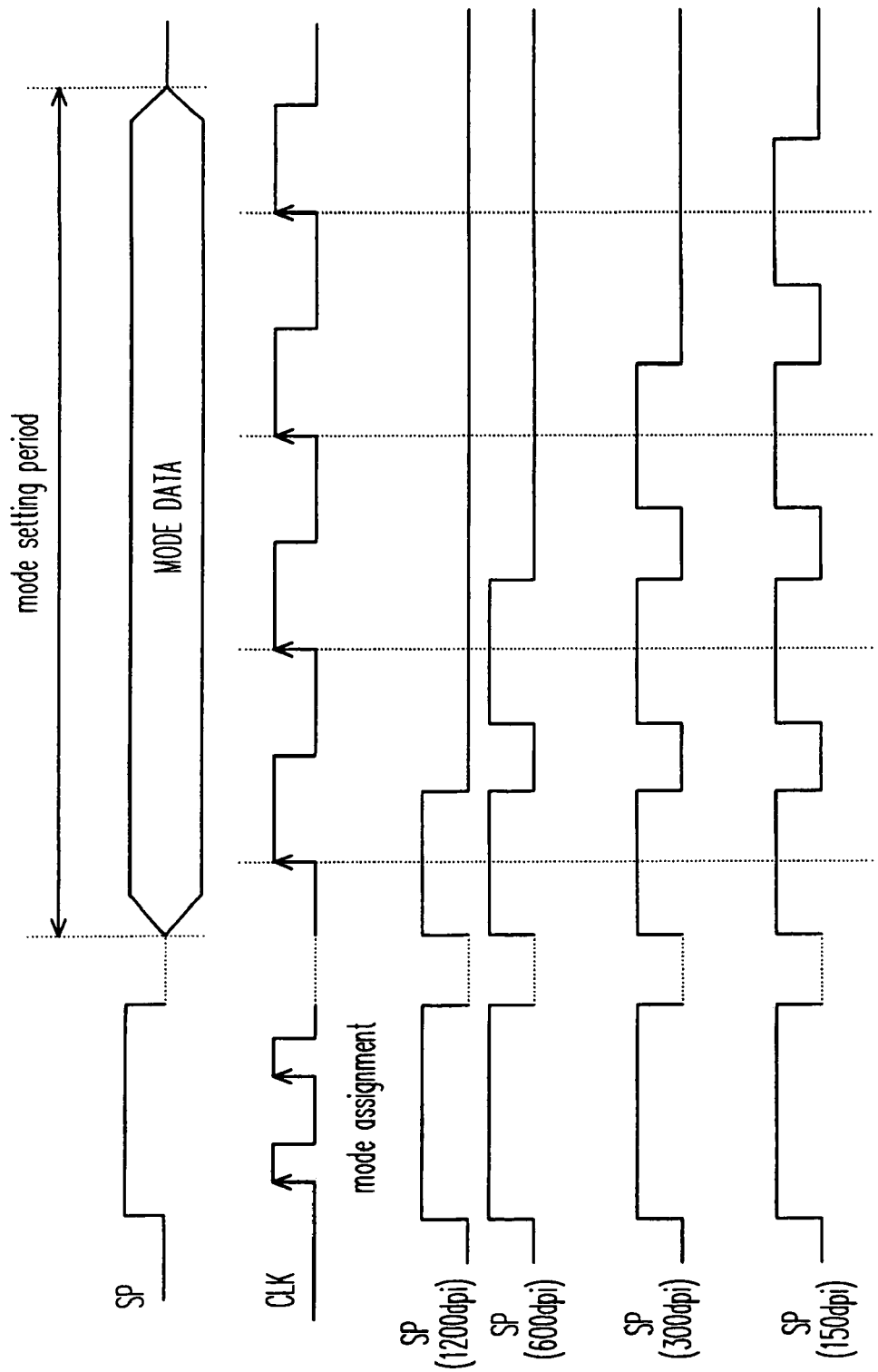
FIG. 11 is a diagram showing the resolution setting according to the fourth embodiment of the invention.

In the fourth embodiment shown in FIG. 11, when the start signal SP detected synchronizing with the rising edges of the clock pulse signal CLK is "H", "L", "L", "L" respectively, the resolution is assigned to 150 dpi. Similarly, "H, H, L, L" is assigned to 300 dpi, "H, H, H, L" is assigned to 600 dpi, "H, H, H, H" is assigned to 1200 dpi. The third embodiment can achieve the following effect. Namely, in this case, if the start signal SP detected at the first and the second rising edges of the clock pulse signal CLK is "H" and "L" respectively, at this time the resolution can be affirmatively determined as 150 dpi. Therefore, the mode setting period is directly ended, and the flip flops (F/F) 37 are activated to begin reading the image immediately.

If the mode setting period can also be interrupted at an early stage for a lower resolution as described in the fourth embodiment, the effect can more obvious. Namely, when the resolution is set lower, the user largely hopes a quick output of the image signal more than a lucidity of the read image. Therefore, if the resolution can be affirmatively determined at the early stage of the mode setting period, user's demands can be further satisfied.

Additionally, in the first embodiment, although the resolution setting is performed for one page at a time (steps S7, S1), the resolution setting of the aforementioned embodiments can be also performed for each line reading in the image. However, the prior case can reduce times of performing the resolution setting, and thus the image reading can be accelerated. Moreover, the resolution setting can be also performed for each job.

Figure 12:
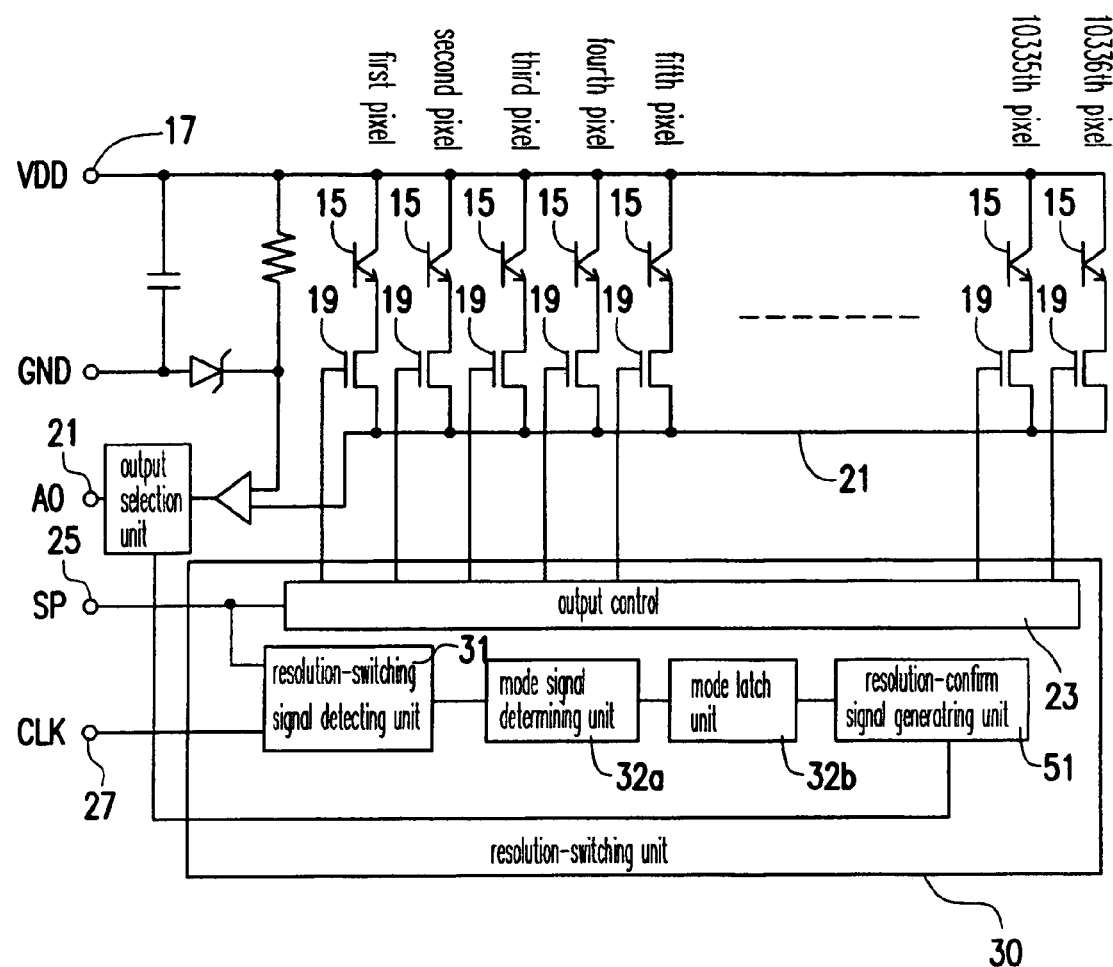
FIG. 12 shows a structure of an image device according to the fifth embodiment of the present invention.
Figure 12:
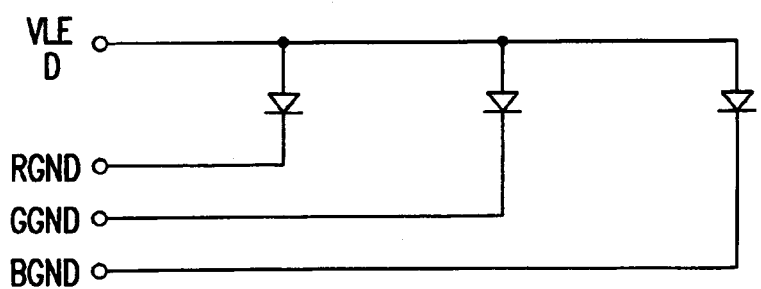
Figure 13:
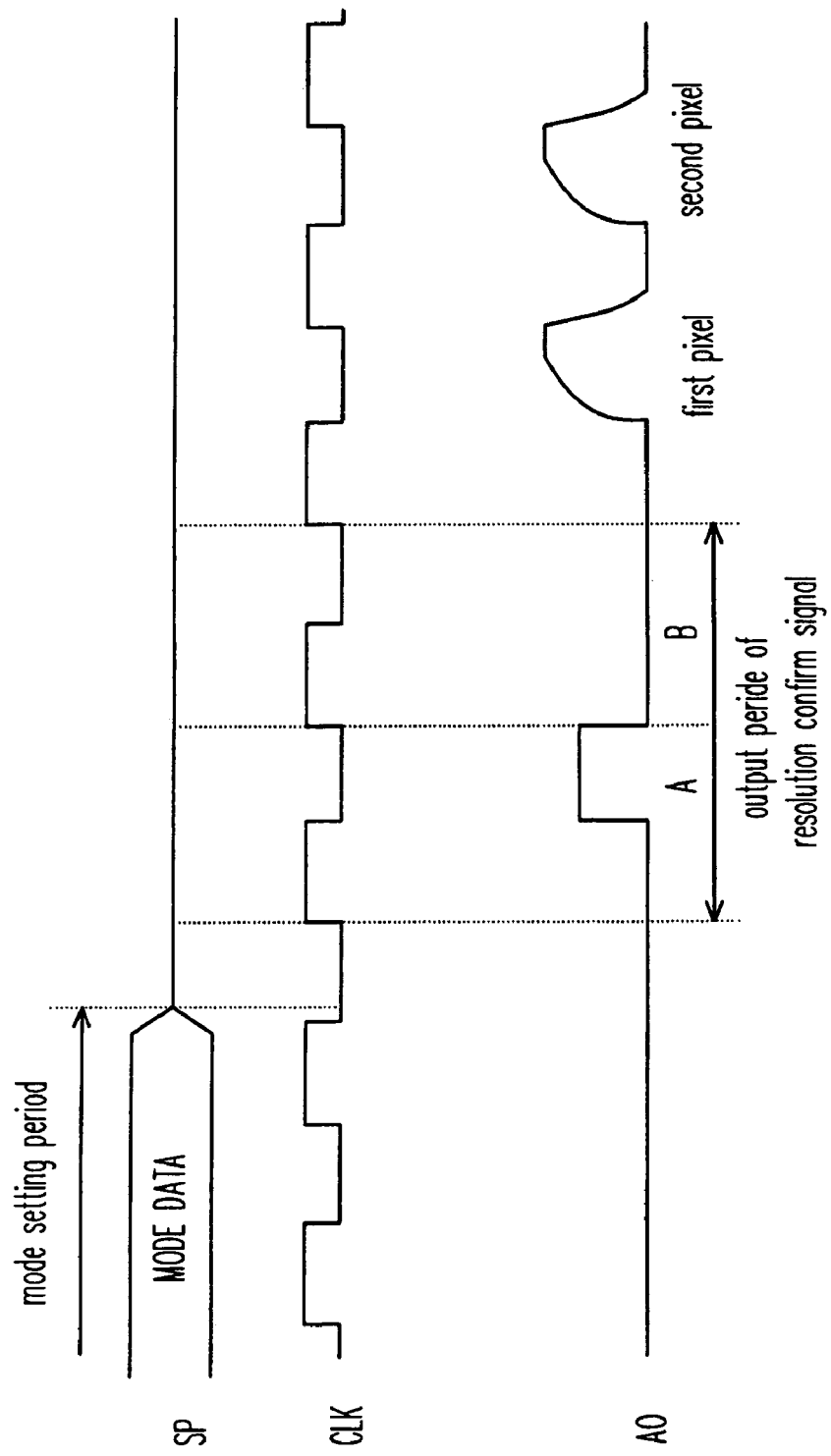
FIG. 13 is a timing diagram showing a resolution-confirm signal according to the fifth embodiment of the present invention.
Figure 14:
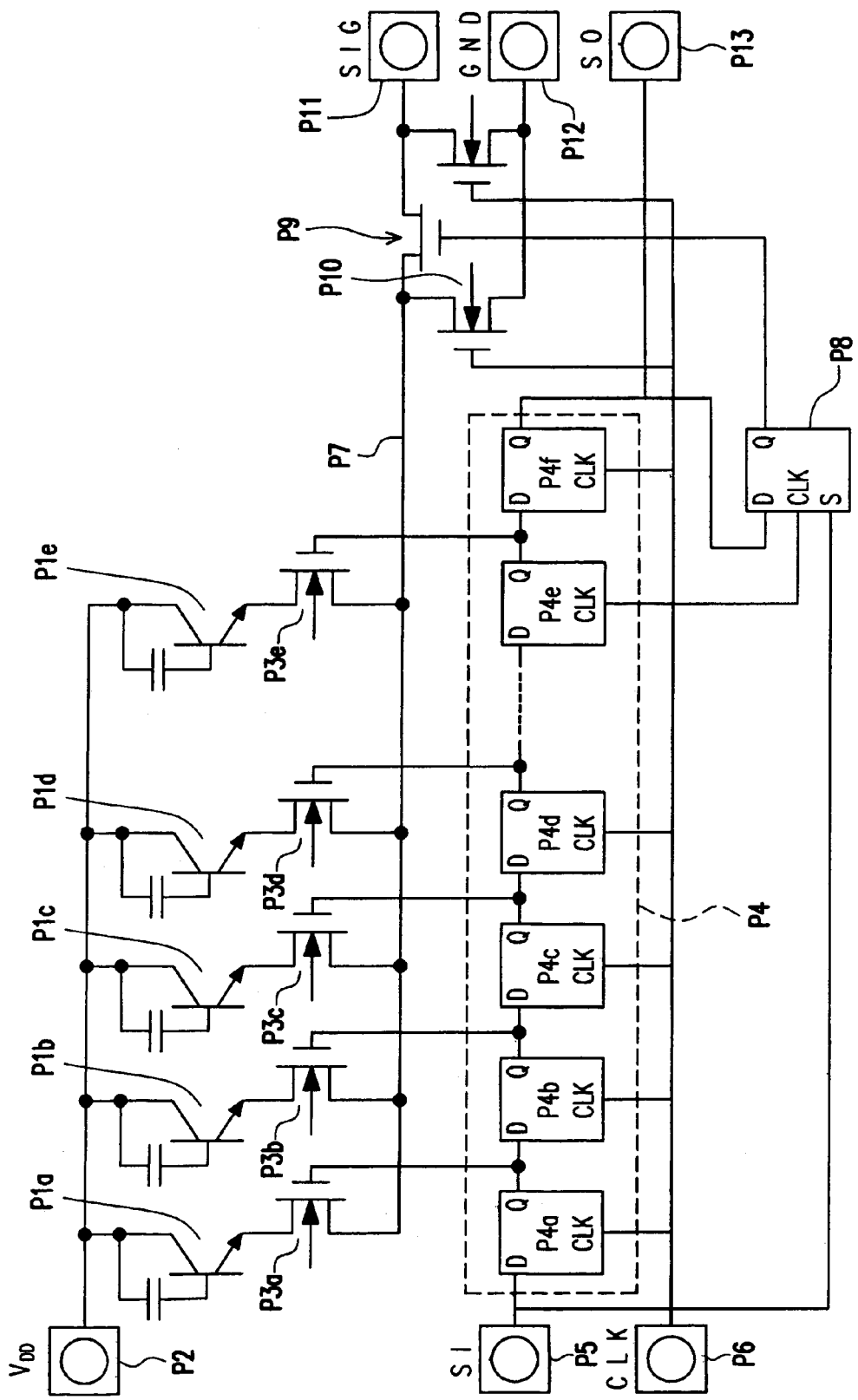
FIG. 14 shows a structure of a conventional image sensor.

FIGS. 12 and 13 show a block diagram and a timing diagram according to the fifth embodiment of the present invention. Further, in the fifth embodiment, the aforementioned first to fifth embodiments can be suitably combined. As shown in FIG. 12, in addition to the structure shown in FIG. 4, a resolution-confirm signal generating unit 51 is further arranged in the resolution-switching unit 30 according to the sixth embodiment. Further, an output selection unit 53 is also included to selectively output one of the output of the resolution-confirm signal generating unit 51 and the charge release from the photoelectric converting elements 15 to the AO terminal 21.

When the resolution is determined in the aforementioned manner and the mode latch unit 32b latches the resolution-switching control signal, the resolution-confirm signal generating unit 51 generates a resolution-confirm signal (a resolution signal) according to the resolution-switching control signal. As shown in FIG. 13, the resolution-confirm signal is output as a two-bit signal A, B at a resolution-confirm signal output period that is set from the end of the mode setting period to the output of the image signal. The correspondence between the values A, B and the resolution is defined in TABLE 2.

TABLE 2

| A | B | resolution |
|---|---|---|
| L | L | 1200 dpi |
| H | L | 600 dpi |
| L | H | 300 dpi |
| H | H | 150 dpi |

In the embodiment, the CPU 13 of the ASIC 5 can determine whether the assigned resolution is correctly set to the image device 3 by reading the resolution-confirm signal. When the resolution-confirm signal shows a difference with the assigned resolution, a warning is asserted, the image reading is interrupted, and the resolution can be reset.

In the aforementioned embodiments, the mode assignment detecting unit 40 is equivalent to means for setting a particular mode, the resolution-switching signal detecting unit 31 and mode signal determining unit 32a are equivalent to means for setting a resolution, and the flip flops (F/F) 41, 42 are equivalent to means for setting a resolution setting period. In addition, the present invention is not limited to the embodiment described above, can be implemented with various modifications under the scope of the invention.

For example, in the aforementioned embodiments, the start signal SP is read synchronizing with the clock pulse signal CLK in the mod setting period, but the resolution can be also determined by inputting pulse-shaped start signal SP that is not synchronized with the clock pulse signal CLK and then counting the pulse number using a counter, etc. However, when the start signal SP is read synchronizing with the clock pulse signal CLK, the process becomes easier. Furthermore, in the above embodiments, because a plurality of the analog switches is turned on at the same time, the electrical signals output from the plural photoelectric converting elements 15 are simultaneously transmitted to the signal line. Therefore, when the resolution other than the maximum resolution is set, the cycle of the reception of the optical signals and the output of the electric signals of the photoelectric converting elements 15 is shorten. Even though the electric signal for each photoelectric converting element 15 is small, the output on the signal line does not become small, so that a high S/N (signal-to-noise) ratio of the read image can be maintained.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. An image sensor, comprising:
   a plurality of photoelectric converting elements, for converting optical signals to electric signals;
   a group of channel select switches, each channel select switch arranged between a charge output unit of each channel select switch and a signal line corresponding to each photoelectric converting element, wherein the group of the channel select switches can be turned on and off sequentially synchronizing with an externally supplied clock pulse signal; and
   particular mode setting means, wherein when a clock pulse signal and a start signal with a fixed width are input, the particular mode setting means sets a particular mode under a specific combination pattern of the clock pulse signal and the start signal.

2. The image sensor of claim 1, wherein the particular mode is a resolution setting mode, and the image sensor further comprises resolution setting means for setting a resolution in the resolution setting mode.

3. The image sensor of claim 2, wherein when the resolution setting mode is set, the image sensor further comprises resolution setting period setting means for setting a resolution setting period, and wherein the resolution setting means sets the resolution in the resolution setting period that is set by the resolution setting period setting means.

4. The image sensor of claim 3, wherein the resolution setting means generates a resolution setting signal for setting the resolution according to a status of the start signal in the resolution setting period.

5. The image sensor of claim 4, wherein the resolution setting means reads a plurality of status of the start signal synchronizing with the clock pulse signal in the resolution setting period, and then generates the resolution setting signal according to a combination of a read result.

6. The image sensor of claim 2, wherein a resolution signal for indicating the resolution is included in an image signal output from the image sensor for each time when the resolution is changed.

7. A reading device, comprising:
   an image sensor, further comprising:
      a plurality of photoelectric converting elements, for converting optical signals to electric signals;
      a group of channel select switches, each channel select switch arranged between a charge output unit of each channel select switch and a signal line corresponding to each photoelectric converting element, wherein the group of the channel select switches can be turned on and off sequentially synchronizing with an externally supplied clock pulse signal, and
      particular mode setting means, wherein when a clock pulse signal and a start signal with a fixed width are input, the particular mode setting means sets a particular mode under a specific combination pattern of the clock pulse signal and the start signal;
   clock pulse signal generating means, for generating the clock pulse signal;
   start signal generating means, for generating the start signal; and
   control means, for controlling the clock pulse signal generating means and the start signal generating means according to a mode.

8. The reading device of claim 7, wherein the particular mode is a resolution setting mode, and the image sensor further comprises resolution setting means for setting a resolution in the resolution setting mode.

9. The image sensor of claim 8, wherein when the resolution setting mode is set, the image sensor further comprises resolution setting period setting means for setting a resolution setting period, and wherein the resolution setting means sets the resolution in the resolution setting period that is set by the resolution setting period setting means.

10. The reading device of claim 7, the clock pulse signal generating means further comprises period changing means for changing a period of the clock pulse signal from a first period for an reading operation of the image sensor to a second period that is different from the first period, and wherein when the particular mode setting due to the control means is performed, the period changing means changes the clock pulse signal to a clock pulse signal corresponding to the second period.

11. The reading device of claim 7, wherein the particular mode setting due to the particular mode setting means is performed for each page in reading an image.

12. A method for setting a particular mode, for an image sensor comprising a plurality of photoelectric converting elements for converting optical signals to electric signals; a group of channel select switches, each channel select switch arranged between a charge output unit of each channel select switch and a signal line corresponding to each photoelectric converting element, wherein the group of the channel select switches is capable of turned on and off sequentially, synchronizing with an externally supplied clock pulse signal, the method comprising:

setting a particular mode under a specific combination pattern of the clock pulse signal and the start signal when a clock pulse signal and a start signal with a fixed width are input, a particular.

13. The method of claim 12, wherein the particular mode is a resolution setting mode, and a resolution is set in the resolution setting mode.

* * * * *